United States Patent
Forster

(10) Patent No.: US 6,598,694 B2
(45) Date of Patent: *Jul. 29, 2003

(54) HUB DRIVE

(75) Inventor: Franz Forster, Karlstadt-Mühlbach (DE)

(73) Assignee: Linde Aktiengesellschaft (DE)

( * ) Notice: Subject to any disclaimer, the term of this patent is extended or adjusted under 35 U.S.C. 154(b) by 185 days.

This patent is subject to a terminal disclaimer.

(21) Appl. No.: 09/771,365

(22) Filed: Jan. 26, 2001

(65) Prior Publication Data

US 2001/0015300 A1 Aug. 23, 2001

(30) Foreign Application Priority Data

Feb. 14, 2000 (DE) .......................................... 100 06 460

(51) Int. Cl.$^7$ .............................................. B60K 17/14
(52) U.S. Cl. ...................................... 180/305; 180/308
(58) Field of Search ................................ 180/307, 308, 180/372, 305, 6.48, 24.07, 367, 242, 244, 247, 65.5; 188/71.5, 106 A

(56) References Cited

U.S. PATENT DOCUMENTS

| | | | | | |
|---|---|---|---|---|---|
| 3,770,075 | A | * | 11/1973 | Vegners ....................... | 180/308 |
| 3,954,026 | A | * | 5/1976 | Rittmann et al. .......... | 74/411.5 |
| 3,969,950 | A | * | 7/1976 | Rau et al. ...................... | 74/391 |
| 4,213,514 | A | * | 7/1980 | Ehrlinger et al. ........... | 180/308 |
| 4,540,073 | A | * | 9/1985 | Rogier ..................... | 192/221.1 |
| 5,115,890 | A | * | 5/1992 | Noel ......................... | 188/71.5 |
| 5,398,776 | A | * | 3/1995 | Forster ....................... | 180/308 |
| 5,431,245 | A | * | 7/1995 | Beck et al. .................. | 180/308 |
| 5,918,529 | A | * | 7/1999 | Forster ....................... | 92/12.2 |
| 6,135,259 | A | * | 10/2000 | Forster ..................... | 192/221.1 |
| 6,248,037 | B1 | * | 6/2001 | Forster .......................... | 475/83 |
| 6,260,653 | B1 | * | 7/2001 | Forster ....................... | 180/308 |
| 6,357,558 | B1 | * | 3/2002 | Case et al. ................. | 188/71.5 |
| 6,443,290 | B1 | * | 9/2002 | Forster .................... | 192/221.1 |

FOREIGN PATENT DOCUMENTS

DE  24 07 274  8/1975  ............. F01B/3/02

* cited by examiner

Primary Examiner—Brian L. Johnson
Assistant Examiner—Bridget Avery
(74) Attorney, Agent, or Firm—Webb Ziesenheim Logsdon Orkin & Hanson, P.C.

(57) ABSTRACT

A wheel hub drive includes a stationary hub carrier, a rotational hub, a hydrostatic axial piston motor using the swashplate construction fastened to the hub drive and in a direct drive connection with the hub, and a brake connected directly between the hub carrier and the hub. To achieve the smallest possible dimensions of the hub drive, the axial piston motor has an external bearing cylinder block and a motor shaft that is free of lateral forces and is rotationally synchronously coupled with the hub. The hub has a separate bearing system for mounting in the hub carrier. A bearing system is radially between a central bearing journal of the hub and a bearing segment connected with or formed on the hub. The bearing system is preferably formed of two helical roller bearings in an O-arrangement. The brake is located radially outside and axially inside the area of the bearing system. A flange provided on the hub for fastening at least one wheel rim has a companion drum that covers the brake. The drum engages with the brake and is detachably connected with the flange. The drum can be fixed in its axial position by wheel fastening bolts. The wheel fastening bolts and/or a longitudinal gearing on the outer peripheral surface of the flange and a longitudinal gearing on the inner peripheral surface of the companion drum can transmit the braking moment between the companion drum and the flange. The brake is a wet, hydraulically actuated spring-loaded multiple-disc brake connected to an oil circuit of the axial piston motor. A sealing element is radially between a terminal segment of the companion drum and the hub carrier. The outside diameter of the hub carrier in the vicinity of the terminal segment of the companion drum is greater than the outside diameter of the brake.

24 Claims, 2 Drawing Sheets

HUB DRIVE

BACKGROUND OF THE INVENTION

1. Field of the Invention

This invention relates to a hub drive, in particular a wheel hub drive, with a stationary hub carrier, a rotating hub, a hydrostatic axial piston motor utilizing the swashplate construction fastened to the hub carrier and connected in a direct drive connection with the hub, and with a brake that is connected directly between the hub carrier and the hub.

2. Background Information

One fundamental problem with hub drives is that the space available is generally limited. For example, when the hub drive is used as a wheel hub drive, it must be installed inside the wheel rim. A hub drive of the prior art is described in DE-OS 24 07 274, in which the bearing system of the motor shaft of the axial piston motor is simultaneously the bearing system of the rotating hub. In this arrangement, the common bearing of the hub, as well as the motor shaft, must be designed so that they are large enough and strong enough to withstand the external loads and propulsion forces (transverse forces) that will be exerted on the hub. It is therefore necessary to make the motor shaft and bearing system very large and strong to keep the bending loads low.

The object of this invention is to make available a hub drive of the type described above that has the most compact dimensions possible, in particular in the radial direction, as well as high power density, and one that can be manufactured easily and economically.

SUMMARY OF THE INVENTION

The invention provides an axial piston motor with an external bearing cylinder block and a motor shaft in the form of a torquing adapter that is free of lateral forces and is coupled rotationally synchronously with the hub, and that the hub has a separate bearing system in the hub carrier.

The motor shaft of the axial piston motor is kept free of the transverse forces exerted both by the propulsion system and external loads, which thereby makes it possible to minimize its diameter. For this purpose, the motor shaft is in the form of a torquing adapter that is free of lateral forces. Accordingly, the cylinder block is not mounted on the motor shaft but in the motor housing, which is called an external bearing system in contrast with an internal bearing system on the motor shaft. The hub is provided with a separate hub bearing system. Because the brake is connected directly between the hub and the hub carrier, the motor shaft does not need to absorb any torsion forces that are caused by the braking moment that is generated during braking. The motor shaft need only absorb the output moment that is delivered by the axial piston motor.

The hub can be mounted on or in the hub carrier. In one embodiment of the invention, the hub has a central bearing journal which is located radially inside a bearing segment that is connected with or is formed on the hub carrier. The hub bearing system is provided radially between the bearing journal and the bearing segment, and the brake is located radially outside the hub bearing system. This construction provides the largest possible diameter of the brake, so that large braking forces can be generated in spite of the compact dimensions of the hub drive of the invention.

The bearing system may consist of two helical roller bearings, in particular two conical roller bearings in an O-arrangement, so that the hub drive can absorb high radial loads. The helical roller bearings may be biased by means of a shaft nut that is located on the bearing journal.

In one refinement of the invention, the brake is located axially in the vicinity of the bearing system, so that compact dimensions are also achieved in the axial direction.

The goal of small dimensions of the hub drive is also achieved by a rotationally synchronous coupling between the hub and the motor shaft. The motor shaft is inserted into a central boring of the bearing journal and is provided with longitudinal gearing that is effectively engaged with longitudinal gearing in the boring (a spline type connection is provided).

If the hub has a flange for the fastening of at least one wheel rim, the hub drive of the invention can be used as a wheel hub drive. In this case, it is advantageous in terms of reducing the time, effort and expense involved in the manufacture of the hub if the flange and the bearing journal are made in one piece with each other. Additional advantages may be achieved by having the hub include a rim centering device and having the flange include fastening borings. The location of the brake in the hub drive of the invention is achieved in a simple manner because the flange has a companion drum that covers and engages with the brake.

It is also advantageous if the companion drum is detachably connected with the flange. In one embodiment, this type of fastening can be achieved by fixing the companion drum in its axial position by wheel fastening bolts. The wheel fastening bolts and/or longitudinal gearing on the outer peripheral area of the flange and longitudinal gearing on the inner peripheral surface of the companion drum (a spline connection) may transmit the braking moment between the companion drum and the flange.

The brake may be a hydraulically actuated spring-loaded multiple-disc brake, and in particular a wet brake. If a brake of this type is connected to the oil circulation system of the axial piston motor, the cooling and filtering devices of the hydrostatic circuit can also be used. The brake is therefore capable of a high braking power.

In this context it is advantageous if, radially between a terminal segment of the companion drum and the hub carrier, there is a sealing element, in particular a shaft gasket. When this shaft gasket becomes worn, it can be replaced easily by removing the companion drum.

The hub drive of the invention can be easily fastened to a vehicle if the hub carrier is provided with a fastening flange.

In one refinement of the invention, the axial piston motor is located inside the hub carrier to save space. In one embodiment of the invention, the hub carrier forms a motor housing for the axial piston motor. A separate motor housing is therefore unnecessary, which reduces the amount of space required. Further, if all the space available is used, the axial piston motor can be realized so that it has greater power.

If the hub carrier, on its end opposite the bearing segment, has a removable cover which is realized in the form of the control base receptacle of the axial piston motor, the space conditions are favorable for the connections of the hydraulic lines to the axial piston motor.

The hub drive of the invention provides that the swashplate can be removed from the hub carrier thereby providing easy installation and removal of the hub drive.

In a second embodiment of the invention, the hub carrier forms a support housing to hold a motor housing of the axial piston motor, whereby the motor housing is fastened in the hub carrier by torque-transmitting and vibration-reducing means that are located radially between the motor housing and the hub carrier. Torque-transmitting and vibration-reducing means are connected to the motor shaft. This hub drive of the invention makes it possible, by isolating the structure-borne noises to prevent or at least reduce the transmission of structure-borne noises. This internal acoustical isolation of the axial piston motor consists of the noise-damping fastening of the motor housing in the hub carrier and of the additional (internal and/or external) isolation of the motor shaft. This construction does not occupy any additional space as compared to acoustical insulation measures that encapsulate the hub drive. The torque-transmitting and vibration-reducing means consist of an elastomer, a combination of elastomers, one or more non-ferrous metals, plastic or a combination of plastics. Combinations of these different types of materials can also be used. An essential teaching of the invention is the interruption or reduction of the transmission of structure-borne noise by the use of intermediate components that have a different modulus of elasticity. Suitable materials or combinations of materials can then be selected depending on the damping properties desired.

In one embodiment of the hub drive of the invention, the axial motor is a fixed displacement motor.

BRIEF DESCRIPTION OF THE DRAWINGS

Additional advantages and features of the invention are explained in greater detail below with reference to the exemplary embodiments illustrated in the accompanying schematic figures, in which.

DETAILED DESCRIPTION OF THE PREFERRED EMBODIMENTS

Figure 1:
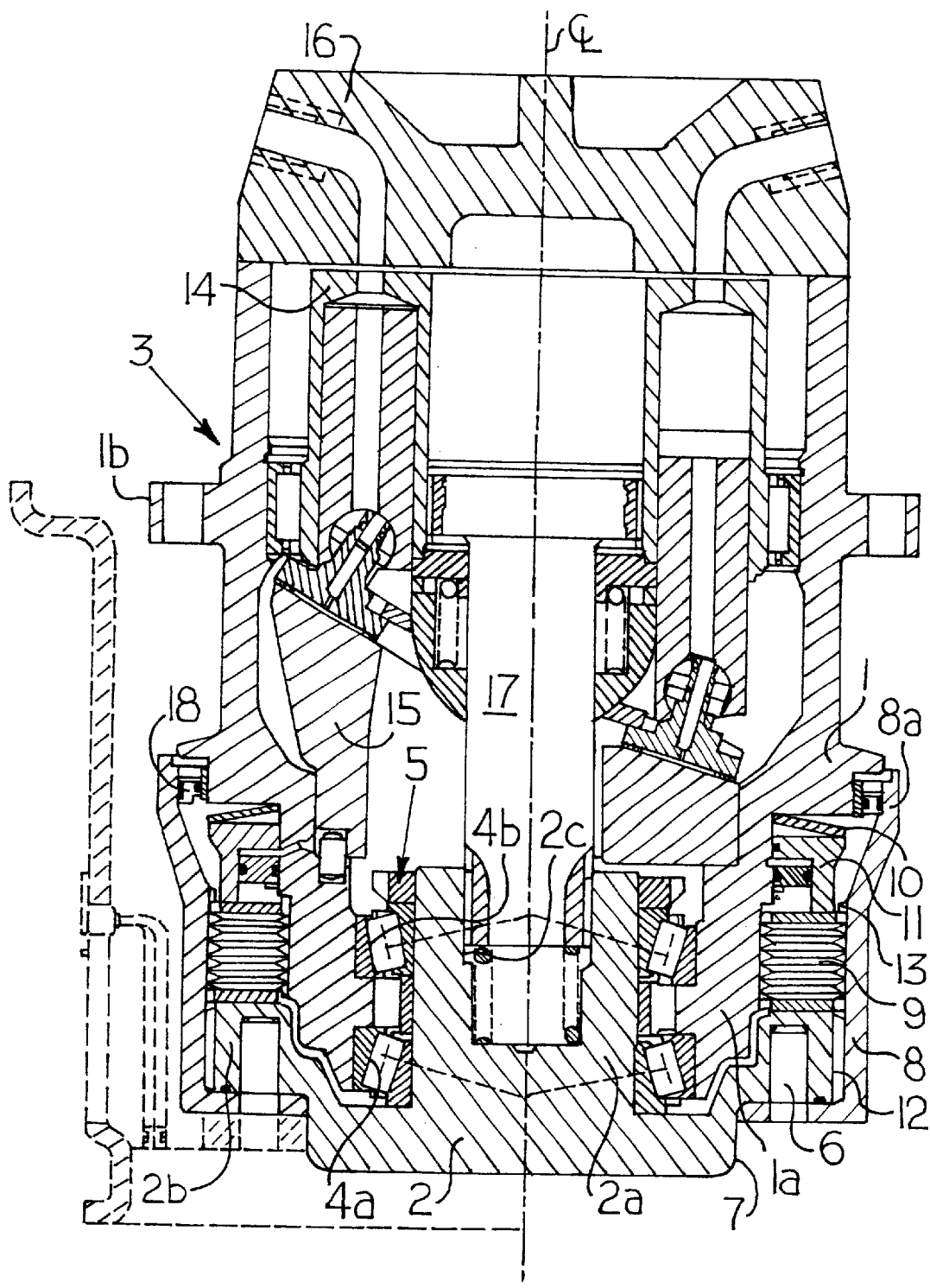
FIG. 1 is a sectional view of a hub drive according to a first embodiment of the invention with a hub carrier that forms a motor housing for the axial piston motor.

The hub drive illustrated in each of the two figures is a wheel hub drive. The hub drive has a hub carrier 1 and a hub 2 that can rotate in it. In the embodiment illustrated in FIG. 1, the hub carrier 1 forms a motor housing for an axial piston motor 3 which is a fixed displacement motor utilizing the swashplate construction. Theoretically, it is also possible to realize the axial piston motor 3 in the form of a variable displacement motor.

The hub 2 has a central bearing journal 2a which is located radially inside a bearing segment 1a formed on the hub carrier 1. Between the bearing journal 2a and the bearing segment 1a there is a hub bearing system that consists of two helical roller bearings (in this exemplary embodiment conical roller bearings) 4a, 4b. The helical roller bearings 4a and 4b are in an O-arrangement and can be biased on the bearing journal 2a by an adjustable shaft nut 5.

The hub carrier 1 is provided with a fastening flange 1b to install the hub drive in a vehicle.

A flange 2b is formed on the hub 2 in one piece with the bearing journal 2a. At least one wheel rim (illustrated in broken lines) can be connected with the hub drive by the flange 2b through the fastening borings (threaded borings) 6 and wheel fastening screws (not shown in the figures). The installation of the wheel rim(s) is facilitated by a rim centering device 7 formed on the hub 2.

A companion drum 8 is also fixed in position axially by the fastening borings 6 and the wheel fastening bolts. A brake 9 that is realized in the form of a spring-loaded multiple-disc brake is located in the drum 8. The brake 9 is pushed by a ring-shaped spring washer 10 in the closing direction and can be hydraulically actuated by an annular brake piston 11. The brake 9 is located radially outside and preferably axially inside the bearing system 4a, 4b. The brake 9 has brake discs that are alternately engaged with the companion drum 8 and the hub carrier 1. The brake 9 is therefore connected directly between the hub carrier 1 and the hub 2. The braking moment is transmitted between the companion drum 8 and the flange 2b of the hub 2 by the wheel fastening bolts and/or longitudinal gearing 12 on the outer peripheral surface of the flange 2b, which is engaged with an axially extended brake disc gearing 13 on the inner peripheral surface of the companion drum 8 (i.e., a spline connection).

Located in the hub carrier 1 are an external bearing cylinder block 14 of the axial piston motor 3 and a swashplate 15. The hub carrier 1 is provided on its end opposite the bearing segment 1a with a removable cover 16, which is realized in the form of the control base receptacle of the axial piston motor 3. When this cover 16 is removed, the swashplate 15, the cylinder block 14 and additional motor components can be installed or removed. When the swashplate 15 is removed, the bearing system 4a, 4b can be installed, removed or adjusted.

The torque is transmitted between the axial piston motor 3 and the hub 2 by a motor shaft 17 which is a torquing adapter. As a result of the external bearing of the cylinder block 14, the motor shaft 17 is not subjected to transverse forces produced by the propulsion. Because the hub 2 has its own bearing system 4a, 4b, the motor shaft 17 is also not required to absorb any external loads. Finally, as a result of the direct connection of the brake 9 between the hub 2 and the hub carrier 1, there are also no braking moments to be transmitted by the motor shaft 17. Consequently, there is no load that would result in the bending of the motor shaft 17. The motor shaft 17 only needs to absorb the drive moment of the axial piston motor 3 and can accordingly be designed with small dimensions.

The motor shaft 17 is rotationally synchronously connected with the cylinder block 14 by longitudinal gearing (i.e., a spline connection). For the rotationally synchronous coupling of the motor shaft 17 with the hub 2, the bearing journal 2a has a central boring 2c into which the motor shaft 17 is inserted. Furthermore, both the boring 2c and the end of the motor shaft 17 inserted into it are provided with longitudinal gearing. This arrangement makes possible an angular adjustment, within certain limits, between the cylinder block 14 and the motor shaft 17 and an alignment adjustment between the cylinder block 14 and the boring 2c.

The brake 9 is connected to the oil circuit of the axial piston motor 3, and therefore runs wet. To prevent leaks, a shaft gasket 18 is located radially between the terminal segment 8a of the companion drum and the hub carrier 1. In the event of wear, the shaft gasket 18 can be replaced easily, because the outside diameter of the hub carrier 1 in the vicinity of the terminal segment 8a of the companion drum 8 is greater than the outside diameter of the brake 9. The companion drum 8 can consequently be pulled to the left in the figure after the wheel bolts have been removed. Consequently, there is no need to remove the brake 9 to change the shaft gasket 18. The hub drive can remain installed on the vehicle.

Figure 2:
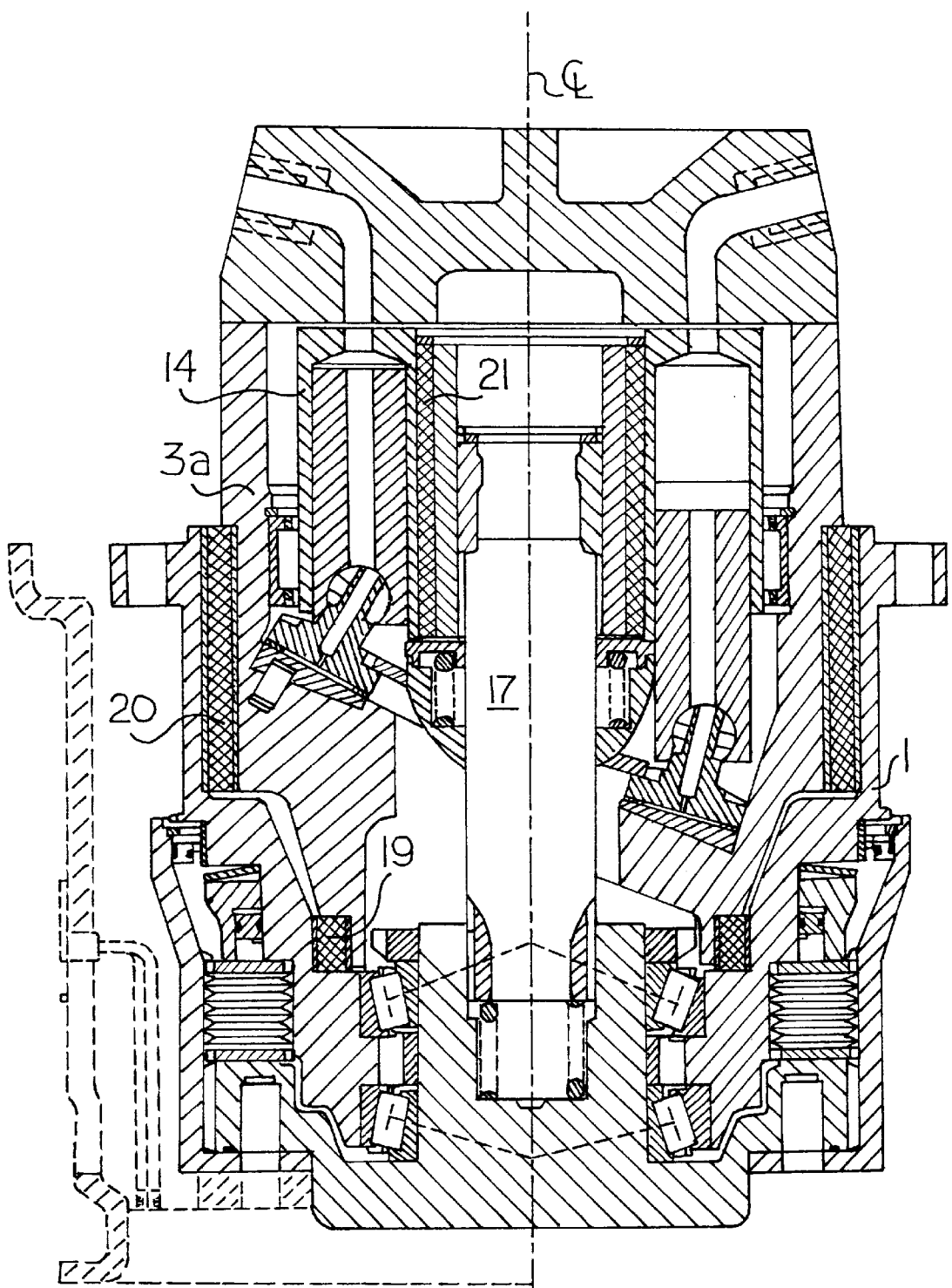
FIG. 2 is a sectional view of the hub drive according to a second embodiment of the invention, in which the hub carrier holds the motor housing of the axial piston motor.

A second embodiment of the invention illustrated in FIG. 2 differs from the embodiment illustrated in FIG. 1 in that the hub carrier 1 does not form a motor housing, but forms a support housing to hold a motor housing 3a of the axial piston motor 3. The motor housing 3a is thereby fastened in the hub carrier 1 by torque-transmitting and vibration-reducing components 19, 20 that are located radially between the motor housing 3a and the hub carrier 1. This arrangement makes it possible to reduce noise and vibrations with unchanged outside dimensions of the hub drive.

The damping components 19, 20 preferably consist of an elastomer. It is also possible, however, to use a combination of elastomers, one or more non-ferrous metals, plastic or a combination of plastics. The objective is to interrupt or reduce the transmission of structure-borne noise by using intermediate components that have a different modulus of elasticity. Suitable materials or combinations of materials can then be selected as a function of the desired damping characteristics.

For a complete acoustical and vibrational isolation of the axial piston motor 3 from the hub drive, there is also a damping component 21 to transmit torque and reduce vibration between the cylinder block 14 and the motor shaft 17. Of course it is also possible, instead of or in addition to this arrangement, to locate a damping component between the motor shaft 17 and the bearing journal 2a.

It will be apparent to those of ordinary skill in the art that various modifications may be made to the present invention without departing from the spirit and scope thereof. The scope of the present invention is defined by the appended claims and equivalence thereto.

I claim:

1. A hub drive comprising:
   a stationary hub carrier;
   a rotational hub mounted in the hub carrier;
   a hub bearing system mounting the hub in the hub carrier;
   a brake connected directly between the hub and hub carrier; and
   a hydrostatic axial piston machine fastened to the hub and in a direct drive connection with the hub, the axial piston machine having a swashplate, an external bearing cylinder block and a motor shaft, wherein the motor shaft is rotationally synchronously coupled with the hub.

2. The hub drive as claimed in claim 1, wherein the hub has a central bearing journal located radially inside a bearing segment of the hub carrier, wherein the hub bearing system is located radially between the bearing journal and the bearing segment, and the brake is located radially outside the hub bearing system.

3. The hub drive as claimed in claim 1, wherein the brake is located axially within the length of the hub bearing system.

4. The hub drive as claimed in claim 1, wherein the hub has a central bearing journal and the motor shaft is inserted into a central boring of the central bearing journal, and wherein the motor shaft includes longitudinal gearing that is connected with longitudinal gearing of the boring.

5. The hub drive as claimed in claim 1, wherein the hub has a flange for fastening at least one wheel rim.

6. The hub drive as claimed in claim 1, wherein the brake is a hydraulically actuated spring-loaded multiple-disc brake.

7. The hub drive as claimed in claim 1, wherein that the hub carrier includes a fastening flange.

8. The hub drive as claimed in claim 1, wherein the axial piston motor is located inside the hub carrier.

9. The hub drive as claimed in claim 1, wherein the axial piston motor is a fixed displacement motor.

10. The hub drive as claimed in claim 2, wherein the hub bearing system consists of two conical roller bearings in an O-arrangement.

11. The hub drive as claimed in claim 5, wherein the hub has a central bearing journal, and the flange and the central bearing journal are one piece with each other.

12. The hub drive as claimed in claim 5, wherein the hub has a rim centering device and the flange has fastening borings.

13. The hub drive as claimed in claim 5, wherein the flange has a drum that covers and is engaged with the brake.

14. The hub drive as claimed in claim 6, wherein the brake is a wet brake.

15. The hub carrier as claimed in claim 8, wherein the hub carrier forms a motor housing for the axial piston motor.

16. The hub drive as claimed in claim 8, wherein the hub carrier is formed as a support housing to hold a motor housing of the axial piston motor, and wherein the motor housing is fastened by torque-transmitting and vibration-reducing means located radially between the motor housing and the hub carrier, and wherein torque-transmitting and vibration-reducing means are coupled to the motor shaft.

17. The hub drive as claimed in claim 10, further including a shaft nut located on the bearing journal wherein the roller bearings of the hub bearing system can be biased by the shaft nut.

18. The hub drive as claimed in claim 13, wherein the drum is detachably connected with the flange.

19. The hub drive as claimed in claim 13, further including a seal element radially between an end of the drum and the hub carrier, wherein the outside diameter of the hub carrier in the vicinity of the end of the drum is greater than the outside diameter of the brake.

20. The hub drive as claimed in claim 14, wherein the brake is connected to an oil circuit of the axial piston motor.

21. The hub drive as claimed in claim 15, wherein that the hub carrier includes a removable cover forming a control base receptacle of the axial piston motor, wherein the cover is on an end of the hub carrier that is opposite of a bearing segment of the hub carrier.

22. The hub drive as claimed in claim 16 wherein the torque-transmitting and vibration-reducing means is selected from the group consisting of an elastomer, a combination of elastomers, one or more non-ferrous metals, a plastic or a combination of plastics, and combinations thereof.

23. The hub drive as claimed in claim 17, further including the means for the transmission of a braking moment between the drum and the flange.

24. The hub drive as claimed in claim 21, wherein the swashplate can be removed from the hub carrier.

* * * * *

UNITED STATES PATENT AND TRADEMARK OFFICE
CERTIFICATE OF CORRECTION

PATENT NO. : 6,598,694 B2
DATED : July 29, 2003
INVENTOR(S) : Franz Forster

It is certified that error appears in the above-identified patent and that said Letters Patent is hereby corrected as shown below:

Column 6,
Lines 4 and 43, "that the" should read -- the --.
Line 54, "claim 17" should read -- claim 18 --.

Signed and Sealed this

Seventeenth Day of February, 2004

JON W. DUDAS
*Acting Director of the United States Patent and Trademark Office*